(12) United States Patent
Alken et al.

(10) Patent No.: US 9,610,622 B2
(45) Date of Patent: Apr. 4, 2017

(54) DEVICE FOR COOLING ROLLS

(71) Applicant: SMS Siemag AG, Duesseldorf (DE)

(72) Inventors: Johannes Alken, Siegen (DE); Matthias Kipping, Herdorf (DE); Ralf Seidel, Dillenburg (DE); Torsten Mueller, Kreuztal (DE)

(73) Assignee: SMS GROUP GMBH, Duesseldorf (DE)

( * ) Notice: Subject to any disclaimer, the term of this patent is extended or adjusted under 35 U.S.C. 154(b) by 55 days.

(21) Appl. No.: 14/398,852

(22) PCT Filed: May 8, 2013

(86) PCT No.: PCT/EP2013/059623
§ 371 (c)(1),
(2) Date: Feb. 3, 2015

(87) PCT Pub. No.: WO2013/167674
PCT Pub. Date: Nov. 14, 2013

(65) Prior Publication Data
US 2015/0231676 A1 Aug. 20, 2015

(30) Foreign Application Priority Data

May 11, 2012 (DE) .................. 10 2012 207 957
Oct. 29, 2012 (DE) .................. 10 2012 219 722

(51) Int. Cl.
*B21B 27/10* (2006.01)
*B21B 37/74* (2006.01)
*B23P 19/00* (2006.01)

(52) U.S. Cl.
CPC .............. *B21B 27/10* (2013.01); *B21B 37/74* (2013.01); *B23P 19/00* (2013.01);
(Continued)

(58) Field of Classification Search
CPC ......... B21B 27/06; B21B 27/10; B21B 37/32; B21B 37/74; B21B 45/02; B21B 45/0203;
(Continued)

(56) References Cited

U.S. PATENT DOCUMENTS 3,357,224 A 12/1967 Muller
3,540,527 A * 11/1970 Grenfell .................. B21B 27/10
165/86

(Continued)

FOREIGN PATENT DOCUMENTS

JP 54-82348 6/1979
JP 59-162107 10/1984
(Continued)

*Primary Examiner* — Edward Tolan
(74) *Attorney, Agent, or Firm* — Abelman, Frayne & Schwab

(57) ABSTRACT

The application is directed to a device (1, 1') for cooling a roll (2), in particular a working roll (2) for rolling rolling stock (3), wherein the device comprises a cooling shell (50, 60) which lies opposite at least one part region of the circumference of the roll surface for forming a cooling gap (5) between the part region of the roll surface and the cooling shell (50, 60), through which cooling gap (5) cooling fluid can flow, and a lever (40, 44) which can be pivoted about a suspension point (8, 48), can be pivoted in the direction of the roll surface and is connected rotatably to a first half (51, 61) of the cooling shell (50, 60) as viewed in the circumferential direction (U) of the roll (2), wherein the cooling gap (5) can optionally be reduced in size or enlarged by pivoting of the lever (40, 44). Furthermore, the device according to the invention comprises a variable-length linear guide (0, 99) which can be pivoted about a further suspension point (88, 48) and is connected rotatably to the second half (59, 69) of the cooling shell (50, 60) as viewed in the circumferential direction (U) of the roll (2).

15 Claims, 3 Drawing Sheets

(52) U.S. Cl.
CPC ..... *B21B 2027/103* (2013.01); *B21B 2267/12* (2013.01); *Y10T 29/49826* (2015.01)

(58) Field of Classification Search
CPC ............ B21B 45/0209; B21B 45/0218; B21B 45/0233; B21B 2267/12; B21B 2027/103
USPC .......................................................... 72/201
See application file for complete search history.

(56) References Cited

U.S. PATENT DOCUMENTS

| | | | |
|---|---|---|---|
| 4,741,193 A * | 5/1988 | Kimura | B21B 27/10 72/201 |
| 5,212,975 A | 5/1993 | Ginzburg | |
| 2012/0031159 A1 * | 2/2012 | Seidel | B21B 27/10 72/6.2 |

FOREIGN PATENT DOCUMENTS

| | | | | |
|---|---|---|---|---|
| JP | 60-231508 A | * | 11/1985 | ............ B21B 27/10 |
| JP | 63-303609 | | 12/1988 | |
| JP | 4-46613 A | * | 2/1992 | ............ B21B 27/10 |
| RU | 2193936 | | 12/2002 | |
| RU | 93352 | | 4/2010 | |
| SU | 1069892 | | 1/1984 | |

\* cited by examiner

DEVICE FOR COOLING ROLLS

RELATED APPLICATIONS

This application is a National Stage application of International application PCT/EP2013/EP059623 filed May 8, 2013, designating the U.S.A. and claiming priority of German applications DE 10 2012 207 957.2 filed May 11, 2012 and DE 10 2012 219 722.2 filed Oct. 29, 2012. The International application PCT/EP2013/059623 and German DE 10 2012 207 957.2 and DE 10 219 722.2 are incorporated herein by reference thereto.

FIELD OF THE INVENTION

The present invention is directed to a device for cooling rolls, in particular working rolls. The invention furthermore relates to a method for using the device and to a cooling device.

PRIOR ART

U.S. Pat. No. 5,212,975 discloses a device for cooling a roll in a rolling mill, that comprises at least one spray beam with several spray nozzles. This spray beam can be moved in a translatory, rotary or pivoting manner in order to adjust the angle of the beam relative to the roller surface or to its distance from the roller. Such devices have the disadvantage of poor efficiency. In particular, comparatively large amounts of cooling agent are required for a sufficient cooling.

W0 2010/099925 A1 discloses a method and a cooling device for cooling the rolls of a roll stand. Here, the rolls are cooled on at least two partial areas along their circumference with a cooling liquid and are cooled by at least two cooling shell segments located opposite the roll surface and connected to each other in an articulated manner. This arrangement has the disadvantage, for example, of the complex construction of the multipartite cooling shell. Another disadvantage can consist in a path guide of the cooling agent flow from the cooling slot which is constricted according to this device and can result in turbulent flows and/or undesirable cross flows in the cooling slot.

A method and a device for cooling a roll are disclosed according to JP 63303609 in which a thin plate is provided opposite the roll surface of a working roll. The slot formed between the roll surface and the plate can be manually adjusted by positioning screws. The upper and the lower end of the shell are provided with water supply boxes and water drain boxes. Furthermore, the device is sealed on top and on bottom on the roll surface by using a pressure screw. This device has the disadvantage, for example, that its adjustment must take place manually. This applies in particular given the background of several daily replacements of rolls in a rolling mill. If a rolling mill has, for example, as is customary, seven roll stands with two working rolls each, they are changed in many cases four times per day. In this case the manual adjustment must take place 56 times per day. Furthermore according to the prior art the plates and cooling shells are coupled to the mounted roll pieces and/or mounted on the roll stand. This requires the dismounting of the cooling device and/or the making available of, for example, 56 specially adapted mounting pieces at each roll change. The costs produced by this are significant.

One object of the invention is to make available an improved cooling device for a roll, in particular for a working roll for rolling metal.

Another object can consist in making possible an automatic adjustability of the device or of the distance of the device from the roller surface to be cooled, in particular after a roll change.

DISCLOSURE OF THE INVENTION

The invention is characterized according to which a device for cooling a roll, in particular a working roll for rolling rolling stock is made available. The device comprises at least one cooling shell opposite a partial area of the circumference of the roll surface for forming a cooling slot that cooling fluid can flow through between the partial area of the roll surface and the cooling shell and comprises a lever that can pivot about a suspension point that can pivot in the direction of the roll surface and is rotatably connected to a first half of the cooling shell, viewed in the circumferential direction of the roll, wherein the cooling slot can be selectively reduced or enlarged by pivoting the lever. Furthermore, the device in accordance with the invention comprises a variable-length linear guide that can pivot about another suspension point and which is rotatably connected to the second half of the cooling shell, viewed in the circumferential direction of the roll.

As a result of this relatively simple, mechanical arrangement the cooling shell can be adjusted in a defined manner and the distance between the shell and the slot can be adapted by the pivoting movement of the lever. Therefore, the construction in accordance with the invention makes available a simplified and improved cooling device for cooling a surface area of a roll.

According to a preferred embodiment the suspension points are arranged opposite the side of the cooling shell facing away from the roll surface. Such an arrangement allows, for example, an especially compact construction of the device.

According to another preferred embodiment, the pivot axis extending through the suspension points extends substantially parallel to the roll axis. In addition, the two suspension points preferably coincide or both suspension points lie in one point. Even this feature simplifies the construction of the device and facilitates the ability to calculate the movements and the positions of the elements of the cooling device.

According to another preferred embodiment the device also comprises a nozzle for introducing cooling agent, preferably cooling liquid, into the slot. In addition, this nozzle is preferably designed and arranged for the substantially tangential introducing of the cooling agent into the slot, in particular counter to the direction of rotation of the roll, and is arranged, viewed in the circumferential direction, on an end of the cooling shell. The cooling action of the device can be further improved by such an arrangement and in particular a high relative speed between the roll surface and the cooling liquid increases the transfer of heat. In addition, a substantially tangential introduction of the cooling fluid into the slot can help to reduce the boundary layer thickness of the flow of cooling liquid in the slot and therefore improve the cooling action again.

According to another preferred device the device comprises a drive unit for pivoting the lever about the suspension point. Such drive units can comprise, for example, electromotors, pneumatic drive units or hydraulic drive units.

According to another preferred device the drive unit comprises a piston cylinder unit that is preferably rotatably connected on one of its ends to the first half of the lever for pivoting the lever and is rotatably supported on its second end. The drive unit preferably engages with its first end on the first end of the lever. This feature makes possible an especially good transfer of force of the drive unit onto the lever and therefore increases the efficiency of the device.

According to another preferred embodiment the lever has a first end area and a second end area, wherein the first end area is rotatably connected to the first half of the cooling shell, viewed in the circumferential direction of the roll, and the second end area can be pivotably supported on the first suspension point. The variable-length linear guide optionally has a first end area and a second end area, wherein its first end area is rotatably connected to the second half of the cooling shell, viewed in the circumferential direction of the roll, and its second end area can be pivotably supported on the other suspension point.

According to another preferred embodiment the cooling shell comprises on its first half a first element or means for contacting the roll surface and comprises on its second half a second element or means for contacting the roll surface, wherein—optionally—each of the elements comprises a rotatable roller or a slide ring or guide block for contacting the roll surface. In the case of a rotatable roller, the axis of rotation of the roller preferably extends parallel to the axis of rotation of the roll. As a result of this feature the cooling shell can make contact with the roll surface and therefore make possible, for example, a determination of the position and/or of the diameter of the roll. This is especially relevant given the background that the rolls have a scouring area. Normally, the height of the cooling slot must be reset manually after a roll change on account of the roll diameter, that is normally changed by the replacement. In other words, the distance of the cooling shell to the roll surface must be readjusted. This is time-consuming and expensive, especially in the case of a plurality of roll replacements. Furthermore, it is determined that sensors for distance measuring (in particular optical sensors) are frequently susceptible to errors and are therefore less suited for rough working conditions of roll work. According to another preferred embodiment the first element, viewed in the circumferential direction of the roll, contacts the roll surface in front of the end of the first half of the cooling shell and the second element contacts the roll surface behind the end of the second half of the cooling shell.

According to another preferred embodiment the lever and the linear guide are pivotably arranged in such a manner around their particular suspension point that the elements can be brought in contact with the roll surface and lifted off from them again by pivoting the lever and by a pivoting and/or a changing of the length of the linear guide. The linear guide can in general be constructed telescopically.

According to another preferred embodiment of the device the device furthermore comprises an evaluation system for determining the position of the roll and/or for adjusting the height of the cooling slot, which system is designed to calculate the height of the cooling slot upon the contacting or by the contacting of the roll surface by the elements and in accordance with the known geometry and/or arrangement of the lever, the linear guide, the cooling shell, the position of the suspension points and of the diameter of the roll. Whether or when the cooling shell makes contact with the roll surface can be determined, for example, using a pressure transmitter of a piston cylinder unit. In the case of an electrical drive, this can be determined, for example, by a measuring of the drive current. Furthermore, an angle measuring device could be installed at the suspension points in order to determine the angular position and the pivot angle of the lever or of the linear guide. Additionally or alternatively, a path transmitter could be provided on the drive units and/or on the linear guide so that using the known geometry of the lever, of the linear guide and of the cooling shell, conclusions could be made about the roll position and also about the distance between the cooling shell and the roll surface. The elements are preferably raised off again from the roll surface for the roll operation. Therefore, wear of the device is excluded.

According to a further preferred embodiment the variable-length linear guide comprises a thrust articulation that preferably comprises a cylinder and a piston guided in the cylinder.

According to another preferred embodiment the variable-length linear guide is formed by a drivable piston cylinder unit.

According to another preferred embodiment the lever or the guide extends like a rod in a plane vertical to the axial direction of the roll to the first half of the cooling shell and preferably to the end of the cooling shell located on this half. However, like a rod is not be understood in such a limiting manner that only straight courses are possible but rather the levers can also have bends or curves but should preferably be rigid or defined in their geometry. Several levers or guides can also be provided parallel to the axial direction of the roll so that several levers or guides are arranged in such a direction.

Alternatively, the lever extends substantially with a plate-like shape in a plane lying parallel to the axial direction of the roll. Again, it does not have to have a level or straight shape but bends or curves of the plate are possible as long as the geometry of the plate is defined or known.

The cooling shell is also constructed to be rigid and/or free of articulations along the circumference direction of the roll and extends parallel to the axial direction of the roll at least partially over the roll or the roll width. If cooling agent is introduced into the slot between the cooling shell and the roll surface by a nozzle, the latter can have a series of several nozzles parallel to the axial direction of the roll or can be designed in a slot-like manner in this direction.

The cooling shell itself preferably consists solely of a rigid or inelastic part that cannot be folded or bent. Likewise, the lever is preferably constructed to be substantially rigid. The support of the lever and of the linear guide can take place, for example, on a common or on different suspension points. These points can already be present on elements present in a rolling plant or a rolling mill and are therefore not necessarily part of the disclosed cooling device.

According to another preferred embodiment of the device the device comprises a wiper for wiping off cooling fluid exiting from the cooling slot on an end of the cooling shell, wherein the wiper preferably extends with a plate-like shape away from the surface of the roll in order to remove the flow of cooling agent exiting from the cooling slot away from the roll. Such a wiper has the advantage, in particular compared to a closed catch box, that the flow of cooling agent exiting from the cooling slot is not substantially disturbed but rather is only deflected. In particular, no cross flows are produced in the cooling slot by the backup in a closed box, which considerably counteract a uniform cooling action of the cooling agent on the roll surface.

Furthermore, the invention is directed to a cooling device that comprises a device in accordance with one of the previous embodiments, wherein the device comprises a carrier frame that can move substantially horizontally and independently of the position of the roll, which frame carries the drive units, the lever and/or the linear guide. In other words, the suspension points are positioned on the carrier frame. That means that the cooling shell can be mounted and/or moved independently of the roll stand or the mounted roll pieces. This facilitates the replacement of the roll considerably and avoids a time-consuming mounting and dismounting of the cooling device during an arrangement replacement. The drive units, lever and/or the linear guide are optionally supported in a rotatable manner on the carrier frame.

More generally, the suspension points are preferably stationary relative to one another.

According to a preferred embodiment of the cooling device it furthermore comprises a working roll, wherein the cooling shell can be positioned on the roll surface by moving the carrier frame and/or the drive units.

Finally, the present invention is directed to a method for using the cited device or the previously described apparatus. The method preferably comprises one or more of the following steps: Making a working roll available; determining the diameter of the working roll; mounting the working roll into a roll stand; approaching the cooling device to the roll surface, preferably by means of the movable carrier frame; contacting the roll surface by the cooling shell, in particular by its elements and/or by pivoting the lever in the direction of the roll surface; calculating the position of the working roll; lifting off the cooling shell by pivoting the lever away from the roll surface and selectively by the drive of the linear guide and/or loading the slot with cooling agent pressure; conducting cooling liquid into the cooling slot; adjusting the distance of the cooling shell from the roll surface by pivoting the lever and selectively by adjusting the pressure of the cooling agent or by the drive of the linear guide; starting a rolling process by the working roll; stopping the rolling process; enlarging the cooling slot by pivoting the lever and/or by moving the device by means of the carrier frame; and removing the working roll from the roll stand. The steps can also be carried out at least partially in a different sequence.

All features of the above-described embodiments can be combined with each other or exchanged with each other.

SHORT DESCRIPTION OF THE FIGURES

The figures of the exemplary embodiments are briefly described in the following. Other details can be gathered from the detailed description of the exemplary embodiments. In the figures.

DETAILED DESCRIPTION OF THE EXEMPLARY EMBODIMENTS

Figure 1:
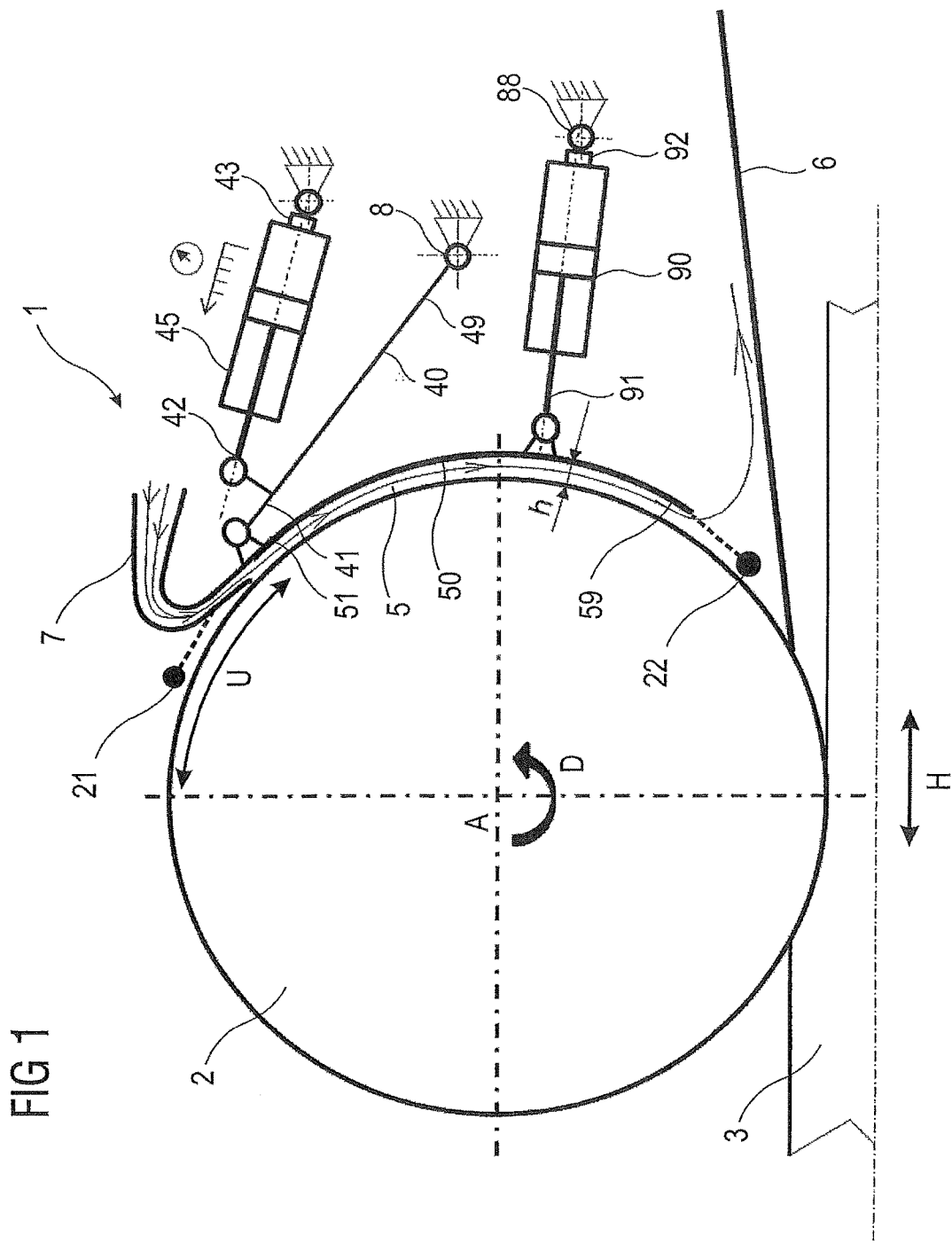
FIG. 1 shows a schematic cross section through an exemplary embodiment, in accordance with the invention, of a cooling device placed on a roll.

FIG. 1 discloses an exemplary embodiment in accordance with the invention of a cooling device 1. This cooling device 1 comprises a cooling shell 50 that extends at least over a partial area of the roll surface in the circumferential direction U of the roll 2. The longitudinal axis or axis of rotation of the roll 2 extends preferably in the axial direction A and can rotate about the roll axis, in particular in the direction of rotation D. As FIG. 1 shows, the cooling device 1 is preferably located on the outlet side of the roll 2 for rolling a metal band 3 but can also be located on the opposite inlet side. The roll 2 preferably constitutes a working roll 2 in a roll stand of a rolling mill (not shown). Cooling fluid, preferably a liquid such as, for example, water can be introduced via a nozzle 7 into the cooling slot 5 formed between the cooling shell 50 and the roll surface. This nozzle 7 can preferably be arranged, as shown, on an upper end of the cooling shell 50 and preferably be connected to it so that cooling agent introduced through the nozzle 7 into the cooling slot 5 leaves the cooling slot 5 at the lower end again, wherein the current of fluid preferably leaves the cooling shell 5 without a barrier. In particular, it is not constricted by a water box that could result in turbulence or cross flows that could extend back even into the slot 5. It is only optionally provided, as shown, that a wiper 6 contacts the roll circumference or the roll surface downstream from the slot 5 in order to remove water from the roll surface and from the metal band 3. Such a wiper 6 can be preferably formed by a plate consisting of metal, plastic or wood.

The positioning of the cooling shell 50 on the roll surface can take place by an arrangement of a lever 40 and of a pivotable linear guide 90, wherein the lever can be pivoted by a drive unit 45. Therefore, it is possible to adjust the slot height h of the cooling slot 5 between the surface or the circumference of the roll 2 and of the cooling shell 50 by the cooling device 1. In other words, the distance h between the cooling shell 50 and the roll 2 can be adjusted or set.

The cooling shell 50 is connected at its upper and or its end area 51 to a first end area 41 of the lever 40. Furthermore, the lever 40 is pivotably mounted on a support 8 on a second end 49. The direction of pivoting can lie in a plane lying vertically to the roller axis A. Lever 40 is preferably rotatably connected at its first end area 41 to the upper half 51 of the cooling shell. A variable-length linear guide 90 is also pivotably supported on one of its ends 92 on a suspension point 88, wherein a first end area 91 of the linear guide 90 is rotatably connected to a lower half 59 of the cooling shell 50.

The suspension points or the support points or pivot points 8, 88 of the lever 40 and of the variable-length linear guide 90 can also lie in a common point. This point can lie, for example, opposite the side of the cooling shell 50 facing away from the surface of the roll 2. The lever 40 can be driven or pivoted by a drive unit 45. To this end the drive unit 45 preferably attacks an end area 41 of the lever 40. As FIG. 1 shows, it is possible that the drive unit 45 is formed by a piston cylinder unit 45. Such a piston cylinder unit 45 can be pivotably supported by one of its ends 43 on a suspension point. The direction of pivoting can again lie in a plane that is vertical to the axial direction A of the roll 2. However, the invention is not limited to piston cylinder units as drive units but rather other drive types such as pneumatic drives or electrical or electromechanical drives can also be used. Drive units can in general comprise path transmitters by means of which conclusions can be made about the orientation of the lever 40. In particular, the linear guide 90 can also have a drive and preferably be formed by a piston cylinder unit 90. Alternatively or additionally, angular measurements can take place that determine the pivot angle of the lever 40 and/or of the pivotable linear guide 90. Such a measurement can preferably take place at the pivot point 8, 88. Furthermore, in the case that piston cylinder units 45, 90 are used, these units can be equipped with pressure transmitters so that, for example, a contacting of the cooling shell 50 with the roll surface can be determined. Alternatively, in the case in which electromotors are used, the received current can be monitored in order to determine a resistance upon a contacting of the cooling shell 50 with the roll surface.

Furthermore, the cooling shell 50 comprises, viewed in the circumferential direction, elements 21, 22 for contacting the roll surface on its two ends. These elements 21, 22 are represented with a dotted connection to the cooling shell 50 since they are not in the area of the cooling agent flow. In other words, they extend away from the ends of the cooling shell 50. Therefore, a preferably rotatable roll 21, 22 can be arranged on these ends whose axis of rotation lies essentially parallel to the axis of rotation A of the roll 2. Alternatively, a sliding strip (not shown) could be arranged on the ends of the cooling shell 50. Here, the elements 21, 22 can be constructed and arranged in such a manner that they contact the roll surface in the circumferential direction U, viewed on the one hand above the upper end of the cooling shell 50 and on the other hand contact it below the lower end of the cooling shell 50. The contact can preferably be established only via the surface of the elements 21, 22 arranged on the cooling shell ends. If the diameter of the roll 2 is known, then upon the contact of the elements 21, 22 with the roll surface, their position in a plane standing vertically to the axial direction A is also given. The position of the suspension points 8, 88 is also preferably not changed or only changed in a defined manner. The positions of the drive unit 45 and of its suspension point and the suspension points 8, 88 are set or fixed relative to each other.

Figure 2:
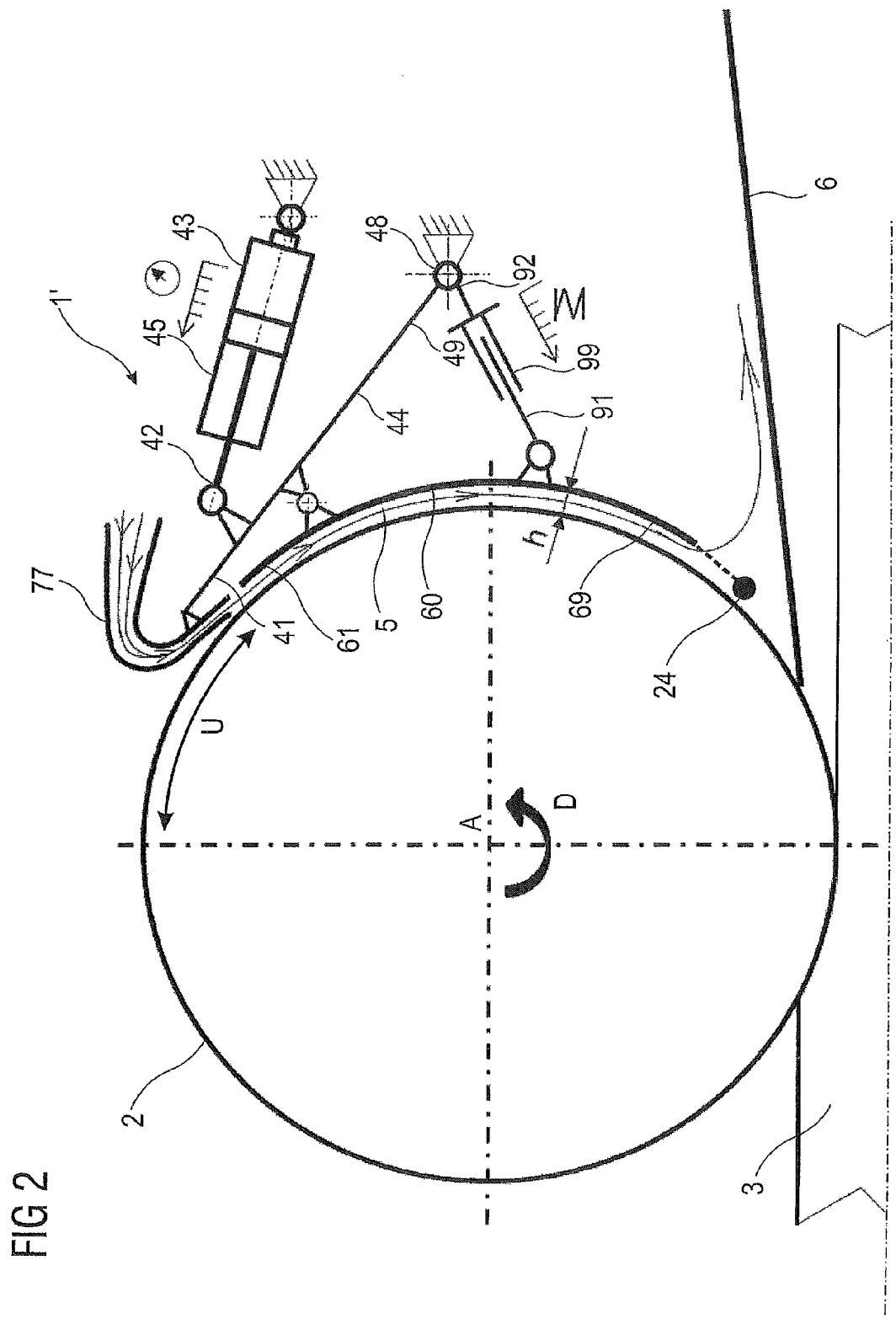
FIG. 2 Shows a schematic cross section through another exemplary embodiment, in accordance with the invention, of a cooling device placed on a roll.

FIG. 2 shows an arrangement according to another exemplary embodiment of the invention. A few elements with the identical function were shown with the same reference numerals as in FIG. 1'. The cooling device 1' comprises a lever 44 that is pivotably or rotatably supported on a suspension point 48 and is rotatably connected to a first half 61 of the cooling shell 60, viewed in the circumferential direction. The lever 44 can be pivoted via a drive by the piston cylinder unit 45 in the direction of the roll surface, as a result of which the distance of the cooling shell 60 from the roll surface can also be adjusted and/or the slot height h regulated. In contrast to the exemplary embodiment of FIG. 1, a nozzle 77 for introducing cooling agent into the slot 5 is not directly or directly connected to the cooling shell 60 but rather is fastened on an end of the lever 44 opposite the suspension point 48. Nevertheless, the nozzle 77 preferably introduces a flow of cooling agent into the slot 5 as tangentially as possible to the roll surface.

Another difference to the previously described exemplary embodiment consists in that the variable-length linear guide 99 is not constructed in a drivable manner, that is, in particular it is not formed by a piston cylinder unit but rather the linear guide 99 shown is, for example, a thrust articulation that is rotatably or pivotably connected on the one hand at a first end 92 to the suspension point 48 and on the other hand is rotatably connected at a second end 91 to the second half 69 of the cooling shell 60, viewed in the circumferential direction. However, this linear guide 99 can also be provided with path meters or pressure meters.

The cooling shell of the device 1' is shown only explicitly with an element 24 for contacting the roll surface which element corresponds to the element 22 in FIG. 1. However, the device 1' also comprises an element that corresponds to the element 21, which element was not shown solely for reasons of clarity in the figure. The elements 24 fastened on both ends of the cooling shell 60 are not arranged in a disturbing manner in the fluid current, as previously described, but rather are preferably located adjacent to the cooling shell 60, viewed in the axial direction.

The slot height h in the first or upper half 61 of the cooling shell 69 can preferably be adjusted by the positioning of the lever 44 whereas the slot height in the second or lower half 69 of the cooling shell 60 can be adjusted by the pressure of the cooling agent conducted into the slot, wherein the linear guide 99 is lengthened or shortened corresponding to the pressure of the cooling agent. In the absence of cooling agent preferably the cooling shell 60 preferably contacts the roll surface with the element 24.

A path limiter for the linear guide 99 can optionally be provided that at least prevents in the operation of the roll that the guide 99 is withdrawn so far that the cooling shell 60 comes in contact with the roll surface.

Figure 3:
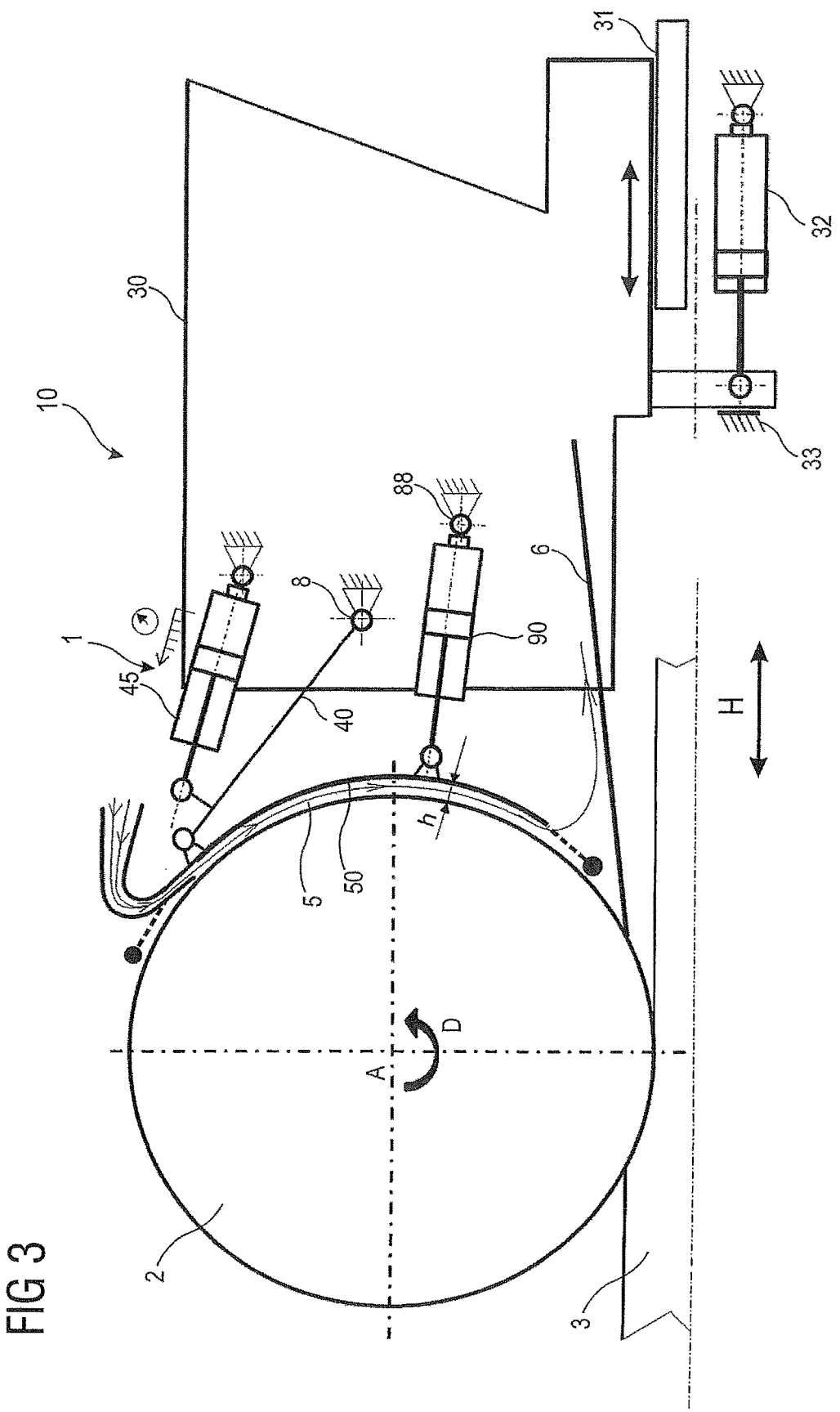
FIG. 3 Shows a cooling apparatus comprising a cooling device according to FIG. 1.

FIG. 3 discloses a cooling device 10 that comprises a cooling device 1 according to FIG. 1. The cooling device 10 comprises a movable carrier frame 30 on which the suspension points 8, 88 of the lever 40 and of the linear guide 90 are present. Furthermore, the drive unit 45 of the lever 40 is preferably also supported in particular pivotably on a suspension point on the carrier frame 30. The points 8, 88 are preferably stationary relative to one another. The carrier frame 30 is preferably designed to be horizontally shiftable so that it can be moved substantially in the horizontal direction H and in the direction of the roll 2 to be cooled or counter to this direction. For example, the carrier frame 30 can be supported on a sliding strip 31. Alternatively, for example, rolls are also possible. The adjustment can take place by a drive 32, for example, by a hydraulic or electrical drive. Furthermore, the device 10 can comprise a stop 33 that prevents a collision of the cooling shell 5 with the roll 2 by moving the carrier frame 30.

If desired, several of the above-described devices 1, 1' or devices 10 can be placed on a roll 2, for example, on the inlet and the outlet side of a roll 2 or of a roll stand.

Furthermore, the levers 40, 44 and the linear guides 90, 91 were described in relation to the arrangement in the FIGS. 1 to 3. However, the levers 40, 44 as well as the linear guide 90, 99 can be exchanged so that the linear guide 90, 99 is connected to the cooling shell 50, 60 on its upper half 50, 61 and the lever 40, 44 is rotatably connected to the lower half 59, 69 of the cooling shell 50, 60.

The above-described exemplary embodiments serve in particular for a better understanding of the invention and are not to be understood to be limiting. The protective scope of the present application results from the patent claims.

The features of the described exemplary embodiments can be combined with each other or exchanged with each other.

Furthermore, the described features can be adapted by a person skilled in the art to given situations or present requirements.

LIST OF REFERENCE NUMERALS

1 cooling device
1' cooling device
2 roll/working roll
3 metal band/rolling stock
5 cooling slot
6 wiper
7 nozzle
8 suspension point
10 cooling device
21 element for contacting the roll surface
22 element for contacting the roll surface
24 element for contacting the roll surface
30 carrier frame
31 guide means 32 drive unit/piston cylinder unit
33 stop
40 lever
41 first end area of the lever
42 first end area of the drive unit
43 second end area of the drive unit
44 lever
45 drive unit/piston cylinder unit
48 suspension point
49 second end area of the lever
50 cooling shell
51 first half of the cooling shell, viewed in the circumferential direction of the roll
59 second half of the cooling shell, viewed in the circumferential direction of the roll
60 cooling shell
61 first half of the cooling shell, viewed in the circumferential direction of the roll
69 second half of the cooling shell, viewed in the circumferential direction of the roll
77 nozzle
88 suspension point
90 linear guide/piston cylinder unit
91 first end area of the linear guide
92 second end area of the linear guide
99 linear guide/thrust articulation
A roll axis
D direction of rotation of the roll
h height of the cooling slot/distance between cooling shell and roll surface
H horizontal direction
U circumferential direction of the roll/direction parallel to the roll surface

The invention claimed is:

1. A device (1, 1') for cooling a working roll (2) for rolling a rolling stock (3), comprising: a cooling shell (50, 60) opposite at least a partial area of a circumference of a roll surface for forming a cooling slot (5) that provides for flow of cooling fluid therethrough between the partial area of the roll surface and the cooling shell (50, 60),
characterized in that the device (1, 1') furthermore comprises means for varying a height (h) of the slot (5) and having:
a lever (40, 44) having a first end area (41) rotatably connected to a first half (51, 61) of the cooling shell (50, 60) viewed in a circumferential direction (U) of the roll (2), in a vicinity of an upper end of the first half of the cooling shell, and a second end area (49) pivotably supported on a first suspension point (8, 48) remote from the shell (50, 60),
a drive unit (45, 46) for pivoting the lever (40, 44) about the first suspension point (8, 40) for displacing the shell between different adjustment positions of the shell corresponding to desired heights (h) of the cooling slot (5), and
a single variable-length linear guide (90, 91) for supporting the shell, extending substantially transverse to a circumferential surface of the shell and having a first end rotatably connected to a second half of the cooling shell, and a second end pivotably supported on a second suspension point (88) remote from the shell.

2. The device according to claim 1, wherein a pivot axis extending through the first and second suspension points (8, 48, 88) extends substantially parallel to a roll axis (A) and the first and second suspension points (8, 48, 88) substantially coincide.

3. The device according to claim 1, wherein the device also comprises a nozzle (7, 77) for introducing cooling agent into the slot (5) counter to a direction of rotation (D) of the roll (2), into the slot (5) and is arranged, viewed in the circumferential direction (U), on an end of the cooling shell (50, 60).

4. The device according to claim 3, wherein the nozzle (7, 77) introduces the cooling agent into the slot (5) substantially tangentially.

5. The device according to claim 1, wherein the drive unit (45, 46) comprises a piston cylinder unit (45) that is rotatably connected, at one of its ends (42), to the lever in vicinity of the first end of the lever (40, 44) for pivoting the lever (40, 44) and is rotatably supported at its opposite end (43) remote from the shell.

6. The device according to claim 1, wherein the cooling shell (50, 60) comprises, on the first half (51, 61), a first element (21) for contacting the roll surface and comprises on the second half (59, 69), a second element (22, 24) for contacting the roll surface; and wherein
each of the first and second elements (21, 22, 24) comprises a rotatable roller (21, 22, 24) or a slide ring for contacting the roll surface.

7. The device according to claim 6, wherein the first element (21), viewed in the circumferential direction (U) of the roll (2), contacts the roll surface in front of the first half (51, 61) of the cooling shell (50, 60) and the second element (22, 24), viewed in the circumferential direction (U) of the roll (2), contacts the roll surface behind the second half (59, 69) of the cooling shell (50, 60).

8. The device according to claim 6, wherein the lever (40, 44) and the linear guide (90, 99) are pivotably arranged in such a manner around the respective first and second suspension point (8, 48, 88) that the first element and the second element (21, 22, 24) is brought in contact with the roll surface and is lifted off therefrom again by pivoting the lever (40, 44) and by at least one of pivoting the linear guide and changing of a length of the linear guide (90, 99).

9. The device according to claim 6, wherein the device furthermore comprises an evaluation system for determining a height of the cooling slot (5), which system is designed to calculate the position of the roll (2) upon the contacting of the first and second elements with the roll surface and in accordance with at least one of known geometry and arrangement of the lever, the linear guide, the cooling shell (50), the suspension points (8) and of the diameter of the roll (2).

10. The device according to claim 1, wherein the variable-length linear guide (90, 99) is formed by a thrust articulation that comprises a cylinder and a piston guided in the cylinder.

11. The device according to claim 1, wherein the variable-length linear guide (90) is formed by a drivable piston cylinder unit.

12. The device according to claim 1, wherein the lever (40, 44) extends like a rod in a plane vertical to an axial direction (A) of the roll (2) to the first half (51, 61) of the cooling shell (50, 60) or extends substantially with a plate-like shape in a plane lying parallel to the axial direction (A) of the roll (2).

13. The device according to claim 1, also comprising a wiper (6) for wiping off cooling fluid exiting from the cooling slot (5) on an end (59, 69) of the cooling shell, wherein the wiper (6) extends with a plate-like shape away from the surface of the roll (2) in order to remove flow of cooling agent exiting from the cooling slot (5) away from the roll (2).

14. A cooling apparatus, comprising a device (1, 1') for cooling a working roll (2) for rolling a rolling stock (3) and having a cooling shell (50, 60) opposite at least a partial area of a circumference of a roll surface for forming a cooling slot (5) that provides for flow of cooling fluid therethrough between the partial area of the roll surface and the cooling shell (50, 60), wherein the device (1, 1') furthermore comprises the means for varying a height (h) of the slot (5) and having:

a lever (40, 44) having a first end area (41) rotatably connected to a first half (51, 61) of the cooling shell (50, 60) viewed in a circumferential direction (U) of the roll (2), in a vicinity of an upper end of the first half of the cooling shell, and a second end area (49) pivotably supported on a first suspension point (8, 48) remote from the shell (50, 60), a drive unit (45, 46) for pivoting the lever (40, 44) about the first suspension point (8, 40) for displacing the shell between different adjustment positions of the shell corresponding to desired heights (h) of the cooling slot (5), and a single variable-length linear guide (90, 91) for supporting the shell, extending substantially transverse to a circumferential surface of the shell and having a first end rotatably connected to a second half of the cooling shell, and a second end pivotably supported on a second suspension point (88) remote from the shell, wherein the apparatus (10) further comprises a carrier frame (30) movable substantially horizontally and independently of the position of the roll (2), which frame carries the lever (40, 44), a lever drive unit (45), and the linear guide (90, 99).

15. A method of cooling a working roll (2) for rolling stock (3), comprising the steps of:

providing a device (1, 1') for cooling a working roll (2) for rolling a rolling stock (3) and having a cooling shell (50, 60) opposite at least a partial area of a circumference of a roll surface for forming a cooling slot (5) that provides for flow of cooling fluid therethrough between the partial area of the roll surface and the cooling shell (50, 60), wherein the device (1, 1') furthermore comprises the means for varying a height (h) of the slot (5) and having:

a lever (40, 44) having a first end area (41) rotatably connected to a first half (51, 61) of the cooling shell (50, 60) viewed in a circumferential direction (U) of the roll (2), in a vicinity of an upper end of the first half of the cooling shell, and a second end area (49) pivotably supported on a first suspension point (8, 48) remote from the shell (50, 60), a drive unit (45, 46) for pivoting the lever (40, 44) about the first suspension point (8, 40) for displacing the shell between different adjustment positions of the shell corresponding to desired heights (h) of the cooling slot (5), and a variable-length linear guide (90, 91) for supporting the shell, extending substantially transverse to a circumferential surface of the shell and having a first end rotatably connected to a second half of the cooling shell, and a second end pivotably supported on a second suspension point (88) remote from the shell;

making a working roll (2) available;

determining a diameter of the working roll (2);

mounting the working roll (2) into a roll stand;

approaching the cooling device to the roll surface by means of a movable carrier frame (30) which frame carries the lever (40, 44), a lever drive unit (45) and the linear guide (90, 99);

contacting the roll surface by first and second elements of the cooling shell (50, 60) (21, 22, 24) by pivoting the lever (40, 44) in the direction of the roll surface;

calculating a position of the working roll (2);

lifting off the cooling shell (50, 60)by pivoting the lever (40, 44) away from the roll surface;

conducting cooling liquid into the cooling slot (5);

adjusting a distance (h) of the cooling shell (50, 60) from the roll surface by pivoting the lever (40, 44) and selectively by adjusting pressure of the cooling agent or a travel path of a piston cylinder unit (90) fastened on the second half of the cooling shell (60);

starting a rolling process by the working roll (2);

stopping the rolling process;

enlarging the cooling slot (5) by at least one of pivoting the lever (40, 44) and moving the device (1, 1') by means of a carrier frame (30) movable substantially horizontally and independently of the position of the roll and that carries the lever (40, 44), the lever drive unit (45) and the linear guide (17); and removing the working roll (2) from the roll stand.

* * * * *